United States Patent [19]

Fruengel

[11] 3,817,623
[45] June 18, 1974

[54] APPARATUS FOR MEASURING VISIBILITY IN A FLUID

[76] Inventor: Frank Fruengel, Glockenacker 2, Zurich, Switzerland

[22] Filed: Feb. 15, 1973

[21] Appl. No.: 332,748

[30] Foreign Application Priority Data
Feb. 25, 1972  Germany............................ 2208904

[52] U.S. Cl.................. 356/103, 250/574, 356/208
[51] Int. Cl. .......................................... G01n 21/26
[58] Field of Search.................... 250/218, 573, 574; 356/103, 104, 208

[56] References Cited
UNITED STATES PATENTS
3,672,775   6/1972   Fruengel............................ 356/103
3,694,936  10/1972   Ling et al............................ 356/208

OTHER PUBLICATIONS
Garland et al.; Journal of Scientific Instruments, Vol. 3, No. 4, April 1970, pages.

*Primary Examiner*—John K. Corbin
*Assistant Examiner*—F. L. Evans
*Attorney, Agent, or Firm*—Michael S. Striker

[57] ABSTRACT

A light source has an outlet opening for emitted light and a light detector is spaced from the light source and has an inlet opening to receive emitted light. The path between these two openings leads through the fluid which is to be measured. A baffle is interposed between the two openings in such a manner that light cannot move from the outlet opening into the inlet opening in a straight path. A pair of omni-directionally light-diffusing cover plates of light-transmissive material are provided, each overlying and closing one of the openings and having an active surface area which is at most slightly larger than the area of the respective opening.

14 Claims, 3 Drawing Figures

FIG.3

APPARATUS FOR MEASURING VISIBILITY IN A FLUID

BACKGROUND OF THE INVENTION

The present invention relates generally to an apparatus for measuring the visibility in a fluid, and more particularly an apparatus for measuring low and very low visibility in fog, in turbid water, and the like.

In many instances it is necessary to automatically switch on signalling devices, such as lights, acoustic signals and the like, in dependence upon the deterioration in the degree of visibility through a fluid. For instance, many turnpikes are now being provided with warning devices which are automatically switched on when visibility decreases due to the development of fog. A particularly important aspect of this is on inland waterways where it is necessary to switch on such signalling devices which were usually mounted on buoys. The space available in such buoys is often very small, so that batteries used for triggering the signalling devices, or low-power electrical generators, must be used which while they require little space also provide only little output. The same is often true on turnpikes where it is quite frequently difficult to supply sufficient electrical current for the necessary purposes. The same is true also in many instances where visibility is to be measured in water, for instance to determine the degree of turbidity of the water.

Another factor to be taken into consideration in the use of apparatus of this type is that the lenses or sight glasses which are usually used in this type of device for passage of light into and out of the respective components, tend to become quite contaminated. In the case of highway applications dust and grease tend to settle on them, and in the case of marine applications encrustations of dried salt particles tend to develop; the latter of course are occassionally washed off by rain. In the case of underwater applications there is a tendency for fouling, for instance due to the growth of algae.

Various types of apparatus for measuring the visibility in a fluid, and for thereupon triggering a warning signal, are already known. Usually they are concerned with measuring the visibility through fog and are based either upon the principle of forward scattering or back scattering of light in the fog. These devices heretofore have been quite complicated in their construction and quite expensive, because they required blowers, anti-dirt devices or other cleaning devices, in order to maintain the optical surfaces clean. Heretofore it has always been a major consideration in the construction of such devices that either the light source which emits a beam of light or the receiver which receives the light, or both of them, must have certain exactly reproducing systems, that is lens or mirror systems. This was particularly necessary because most of these types of apparatus operate on the so-called comparimeter principle, that is they compare the intensity of the incident light with a portion of the signal beam which is for instance transported via fiber or other light conductors from the emitter to the receiver, with the portion and the incident light being compared in an expensive high-quality optical system by means of a wedge filter.

However, the art knows of no apparatus which is very small in its dimensions and can therefore be used in many applications heretofore closed to the existing apparatuses. Moreover, the art knows of no apparatus which requires very little energy for its operation and which is not influenced by fouling, deposition of particles or the like, as are the prior art apparatuses.

SUMMARY OF THE INVENTION

Accordingly, it is an object of the present invention to provide an apparatus which overcomes the disadvantages of the prior art and affords the benefits which have been indicated above as being desirable.

More particularly it is an object of the present invention to provide an improved apparatus for measuring visibility in a fluid, such as air or water, which is small in construction and relatively inexpensive to produce.

Another important object of the invention is to provide such an apparatus which is not susceptible to interference in its operation by fouling by marine growth in case the apparatus is used underwater, or by deposition of dust, salt spray or the like if the apparatus is used above water.

In keeping with these objects, and with others which will become apparent hereafter, one feature of the invention resides in an apparatus for measuring visibility in a fluid, in a combination comprising light source means having an outlet opening for emitted light, and light detecting means having an inlet opening positioned to receive emitted light and spaced from the outlet opening along a path leading through the fluid to be measured. Baffle means is interposed between the outlet opening and the inlet opening and positioned to prevent direct incidence of the emitted light into the inlet opening. A pair of omni-directionally light-diffusing cover plates of light-transmissive material is provided, each overlying one of the openings and having an active surface area which is at most slightly larger than the area of the respective opening.

The present invention is based upon the realization that an inherently matte surface having light-diffusing properties which are as near as possible omni-directional will not become more matte if additional light-diffusing particles such as salt crystals, dust or algae growth become deposited on it. Moreover, only a small and negligible reduction in the light transmissivity of the material will be brought about by such deposition. Using a plate having such a surface in conjunction with an appropriately small light source and an appropriately small light detector, if desired or necessary in conjunction with a narrow bandpass filter, permits a construction which is very small in its physical dimensions. This, in turn, results not only in a reduction of the space required for the apparatus but also—and even more importantly—makes possible a miniaturization of the apparatus and all of its components with a concomitant drastic reduction in the amount of electrical energy required for operating the apparatus.

The novel features which are considered as characteristic for the invention are set forth in particular in the appended claims. The invention itself, however, both as to its construction and its method of operation, together with additional objects and advantages thereof, will best be understood from the following description of preferred embodiments when read in connection with the accompanying drawing.

BRIEF DESCRIPTION OF THE DRAWING

FIG. 3 is a view similar to FIG. 1 but illustrating yet an additional embodiment of the invention.

DESCRIPTION OF THE PREFERRED EMBODIMENTS

Figure 1:
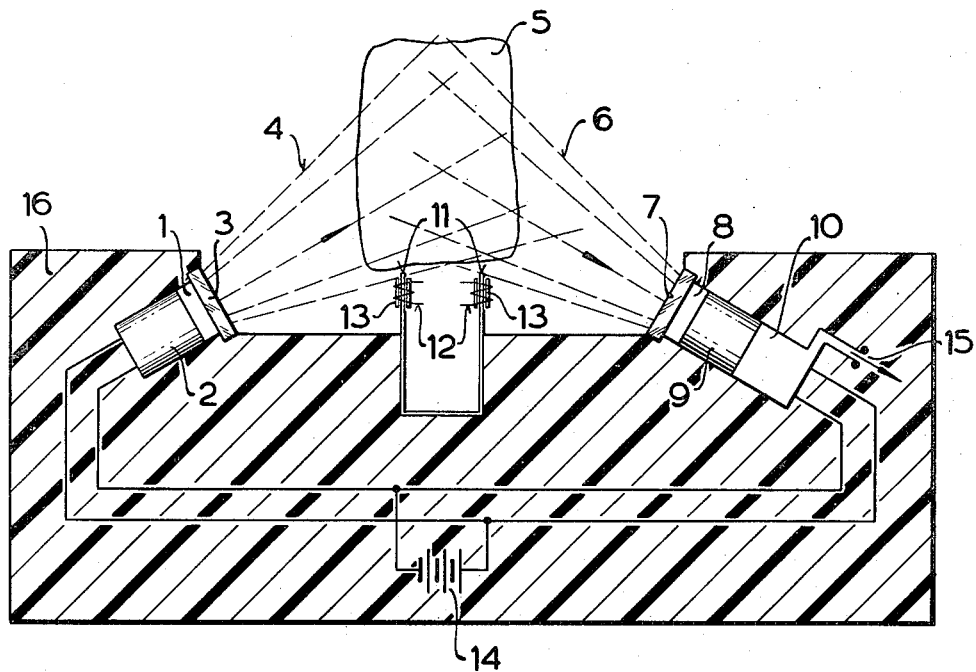
FIG. 1 is a partly sectioned diagrammatic view illustrating one embodiment of the invention.

Discussing firstly the embodiment illustrated in FIG. 1, it will be seen that a light source 1 is provided which emits light. Such a light source may for instance be a small laser diode of gallium arsenide, a luminescent diode, a constantly burning incandescent lamp or a small spark discharge lamp. In any case, it can be a light source which is well known and which produces emitted light in the visible or even the invisible spectrum. It is mounted in a holder 2, for instance a socket which receives electrical energy from a source, here illustrated as a battery 14.

In the prior art such light sources were simply permitted to emit light through an opening, or through an optical system. In contradistinction to the prior art, the present invention provides for a cover plate 3 which is capable of omni-directionally diffusing the light passing through it from the light source 1. This cover plate 3 may for instance be a ground-glass cover plate. It is important that it provide for light diffusion which is optically omni-directional to the greatest possible extent. The cover plate 3 must reflect as little of the light as possible in direction towards the light source 1 and must permit as much light as possible to be emitted in the maximum possible diffused manner in the direction of radiation 4.

Reference numeral 5 in FIG. 1 designates diagrammatically the volume of space into which the diffused light is emitted and which contains the fluid (the atmosphere or the hydrosphere) the visibility in which is to be measured. The embodiment of FIG. 1 utilizes the forward-scattering principle, and it will be appreciated that the radiation 4 will be scattered increasingly by moisture droplets of fog present in the space 5, atmospheric dust particles or the like, or aerosols, or whatever substance may cause turbidity in water if the space 5 is filled by the hydrosphere. This increasing scattering is indicative of decreasing visibility, that is the lower the visibility the more the light will be scattered.

Spaced from the light source 1 is a receiver or detector 8, for instance a photoelectric diode or the like, and overlying the receiver 8 is another cover plate 7 which is identically the same in its characteristics as the cover plate 3, in that it is an omni-directionally light-diffusing cover plate. The light scattered in the volume of space 5 arrives as indicated by the arrows at the receiver 8 and through the plate 7 from many angular directions, and its detection by the receiver 8 triggers a signal which is supplied to an amplifier 9 and from there to a discriminator 10. The discriminator may for instance be adjustable so that it can be set for a certain range of visibility (e.g. in terms of feet), so that when the signals received indicate the visibility is less than the preset value the discriminator will close a contact or otherwise originate a signal, for instance causing a semiconductor to become conductive, which signal is supplied to the output 15 from where it travels to the non-illustrated warning devices which are to be switched on.

Components such as the light source 1, the receiver 8 and the amplifier 9 and the discriminator or comparator are conventional and well known to those skilled in the art. For further information concerning these components references may for instance be had to my prior U.S. Pat. No. 3,672,775.

The apparatus which, it might be pointed out, is being shown in FIG. 1 in approximately the size at which it can be constructed in actuality, may be fluid-tightly encapsulated by embedding it in a potting material 16, such as a suitable synthetic plastic resin. In the case the entire apparatus becomes a single unitary module of extremely compact dimensions.

FIG. 1 also shows that a baffle 11 of for instance U-shaped profile is provided, two baffle edges of which extend transversely intermediate the light source 1 and the receiver 8 (normal to the plane of FIG. 1) and whose purpose it is to prevent direct incidence of light onto the cover plate 7 from the light source 1. If the apparatus is used in the atmosphere and subject to icing, the aforementioned apparatus may be heated by conventional heating elements (for instance resistance heating wires) 12, insulated from the baffle 11 by insulating layers 13, to a sufficient extent so that ice cannot form on these edges (and reflect light) and so that for instance raindrops will dry rapidly.

However, it is also possible to provide a heating element which is in thermally conductive relationship with the transverse wall bounding the two side walls of the U-shaped baffle 11 and embedded in the potting material 16, so that heat travels through the side walls and heats the edges thereof. In the latter case the baffle 11 should be of a material having good heat-conducting properties, for instance blackened copper or the like.

It is important to realize that the amount of electrical energy which must be supplied to the edges of the baffle 11 which are to be heated represents the maximum components of the overall energy requirement for operation of the apparatus, and of course it is therefore important that the entire apparatus be very small so that the dimensions of the edges to be heated are similarly small and as little electrical energy as possible is required to afford such heating. In actual practice the dimensions need never be more than ten times larger than the optically active surface at the diameter of the cover plates 3, 7; frequently the diameter of the plates 3, 7 can be as small as 10 mm and the width of the U-shaped baffle be less than 50 mm. In addition the free edges of the baffle 11 cannot only be blackened, but also provided with a water-repellant coating, for instance a synthetic plastic on silicone basis, so that less heat is required to dry moisture that has become deposited on these edges, or so that the deposition of moisture can be entirely avoided.

It is clear from the disclosure that the apparatus according to the present invention can also be used in the hydrosphere, that is in water. In this case problems may be encountered with the growth of algae on the free edges of the baffle 11, but this can be counteracted by heating the free edges to a sufficient extent. In such an application it is advantageous if at least the free edges of the baffle 11 are made of (or coated with) a heavy metal (such as copper) which has anti-fouling properties. The plates 3 and 7 are then advantageously also made of a material which prevents growth of such algae, for instance a matte boron silicate glass in the surface of which there may additionally be embedded heavy metal ions, which serve to further discourage the growth of such algae. If necessary, it is also possible to vapor-deposit a grid of heavy metal on the exposed surfaces of the plates 3 and 7, and in this latter case it is advantageous if these plates are then matte not on the surface but within their internal structure itself.

Figure 2:
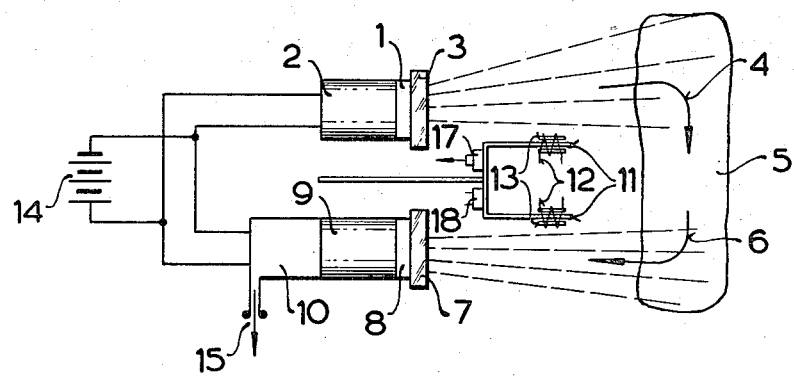
FIG. 2 is a top-plan view, also diagrammatically illustrated, showing a further embodiment of the invention.

FIG. 2 shows a further embodiment which, unlike that of FIG. 1, uses the back-scatter principle. The components are largely the same as in FIG. 1, and therefore like reference numerals designate like components.

In FIG. 2, however, a portion of the light emitted in the path 4 by the light source 1 is back-scattered in the volume of space 5 so that the light which arrives in direction 6 at the receiver 8 is correspondingly diminished and again indicative of the degree of visibility in the space 5.

In this as in all other embodiments it is important that the total path to be traversed by the emitted light from the plate 3 to the plate 7 must be minute as compared to the smallest degree of visibility which it is desired to measure. Thus, the path must be for instance one-tenth of the degree of visibility to be measured. In other words, if it is desired to measure a degree of visibility of 100 cm, then the distance between the plates 3 and 7 should be 10 cm or even less. With the present invention this is possible and assured because light paths from the plate 3 to the plate 7 of as little as 5 to 10 cm are already sufficient to determine the visibility in the space 5, which means that (given a light path of 5 cm) a visibility as low as 50 cm (one-half of one meter) can still be measured.

Such small degrees of visibility are most commonly encountered in turbid waters. If the apparatus according to the present invention is used in such an application, it should be water-tightly encased (for instance in a suitable synthetic plastic material, leaving only the plates 3 and 7 exposed, or even covering those providing that the encasing material is appropriately transparent. The apparatus can then be used for measuring visibility in (and the turbidity of) rivers, inland waterways, lakes, seawater or even discharged industrial effluent. In such case an interference filter 7a is utilized which may be interposed between the receiver 8 and the plate 7, or which may be vapor-deposited directly on the rear or inner side of the plate 7. Such a filter may be utilized to screen out other than the laser or fluorescent radiation emitted by the light source 1. The use of the filter 7a is shown in FIG. 3.

Figure 3:
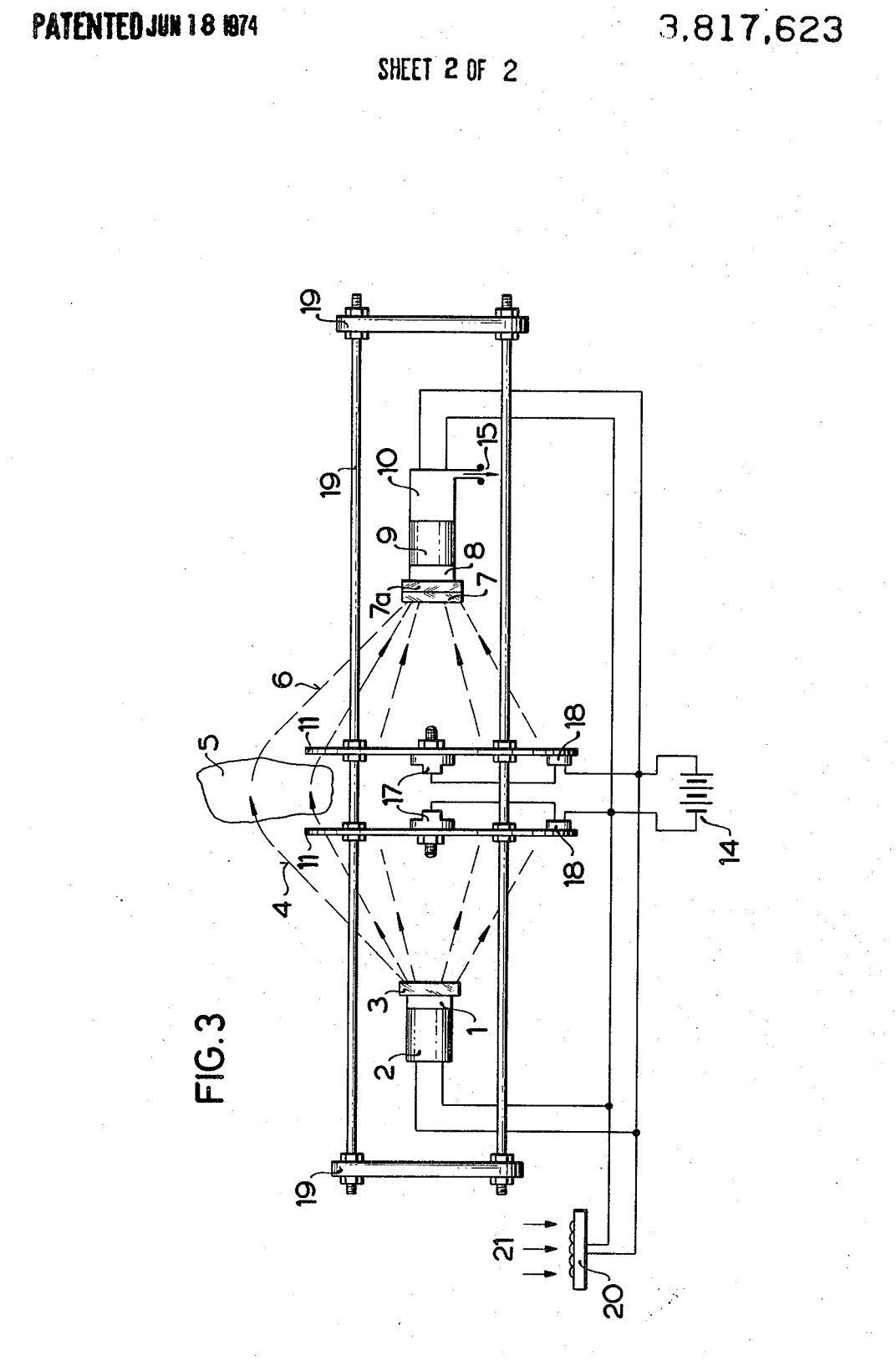

FIG. 3 differs, however, from FIGS. 1 and 2 in other respects also, although it does have components which are the same as in FIGS. 1 and 2, and which are therefore designated with the same reference numerals. The embodiment in FIG. 3 is symmetrically constructed and here the heater for the baffle 11 is in form of heating transistors 17 which are connected with the baffle 11 in heat-transmitting relationship. Two further transistors 18 which are also in good thermally conductive contact with the baffle 11, sense the baffle temperature and in known manner regulate the operation of the heating transistors 17 in order to impart to the baffle 11 a constant temperature. Unlike the embodiments of FIGS. 1 and 2, the volume of space 5 in the embodiment of FIG. 3 wherein the visibility is to be measured surrounds the baffle 11 (which is here of two components) which is for instance of annular or circular outline. It should be pointed out, incidentially, that a single appropriately dimensioned heating transistor 17 can be utilized for heating both of the components of the baffle 11, and a single transistor 18 (i.e., thermistor) sense the temperature and control operation of the transistor 17. This is too well known to require detailed discussion.

A common mounting arrangement 19 is provided which mounts the components associated with the light source as well as those associated with the receiver. It is advantageous but not absolutely necessary that it be located within the conical volume of space defined by the shortest path that can be traversed by the emitted rays, that is the path portion 4, 6 in which the emitted rays travel the shortest distance from the plate 3 to the plate 7. Such an arrangement prevents an interference of the mounting arrangement 19 with the space 5 in which measurements are to be conducted. The material that can be used for the baffle 11 has been discussed above with respect to FIGS. 1 and 2.

FIG. 3 shows a further concept, namely a silicon photocell arrangement 20 which is connected in parallel with the battery 14 and which continuously charges the battery 14 when bright light (for instance bright daylight) impinges upon it. This is a particularly advantageous construction because it permits the use of a small storage battery which is frequently recharged and thus makes for an extremely small overall construction and weight of the apparatus. The arrangement 20 is particularly advantageous in the case of apparatus of the type under discussion which is used on or in buoys because the operational conditions in which fog is present will occur much less often than conditions where fog is absent. This means that during the times when there is no fog, battery 14 is recharged by the arrangement 20, usually during the day, so that it will always be in charged condition when it is required to supply energy. The use of the arrangement 20 by itself is not practical even during the daytime because it does not supply sufficient electrical energy to operate the apparatus. In conjunction with the battery 14, however, the efficiency of the apparatus is vastly increased by addition of the arrangement 20.

It is clear from what has been set forth above that with the apparatus of the present invention a device has been created which can be universally used both in the atmosphere and in the hydrosphere, and which is inexpensive to construct due to its simplicity, which is small and light in weight and which is not influenced in its reliability or operation by the contaminations that prevent prior-art apparatus of the same type from properly operating.

It will be understood that each of the elements described above, or two or more together, may also find a useful application in other types of constructions differing from the types described above.

While the invention has been illustrated and described as embodied in an apparatus for measuring visibility in a fluid, it is not intended to be limited to the details shown, since various modifications and structural changes may be made without departing in any way from the spirit or basic concept of the present invention.

Without further analysis, the foregoing will so fully reveal the gist of the present invention that others can be applying current knowledge readily adapt it for various applications without omitting features that from the standpoint of prior art fairly constitute essential features of the generic or specific aspects of this invention and, therefore, such adaptations should and are intended to be comprehended within the meaning and range of equivalence of the following claims.

What is claimed as new and desired to be protected by Letters Patent is:

1. In an apparatus for measuring visibility in a fluid, a combination comprising light source means having an outlet opening for emitted light; light detecting means spaced from said light source means and having an inlet opening positioned to receive light emitted by said light source and travelling from said outlet opening to said inlet opening along a path leading through the fluid to be measured; baffle means interposed between said outlet opening and said inlet opening and positioned to continuously prevent direct incidence of the emitted light into said inlet opening; heating means for heating said baffle means; and a pair of omni-directionally light-diffusing cover plates of light-transmissive material, each overlying one of said openings and having an active surface area which is at most slightly larger than the area of the respective opening.

2. A combination as defined in claim 1, wherein said cover plates are substantially circular and have a diameter of up to substantially 25 mm.

3. A combination as defined in claim 1; and further comprising a potting material embedding and fluid-tightly encapsulating said light source and light detecting means and part of said baffle means.

4. A combination as defined in claim 1, said light source means comprising a laser diode operative for emitting constant-amplitude light pulses; and further comprising an optical narrow-bandpass filter inwardly of the cover plate associated with said inlet so as to permit entry of only the light pulses of said diode.

5. A combination as defined in claim 1, wherein said cover plates are ground-glass plates.

6. A combination as defined in claim 1, wherein said fluid is water; and wherein said plates are of a material resistant to the formation of marine growths thereon.

7. A combination as defined in claim 6, wherein said material is boron-silicate glass with a vapor-deposited heavy-metal ion film thereon.

8. A combination as defined in claim 1, wherein said baffle means is at least in part composed of optically blackened heavy metal.

9. A combination as defined in claim 8, wherein said metal is selected from copper and brass.

10. A combination as defined in claim 1, wherein said baffle means comprises a U-shaped baffle element having side walls provided with free edges, and a transverse wall; and wherein said heating means is provided on said transverse wall so as to heat said free edges via said transverse and said side walls; and further comprising potting material fluid-tightly encapsulating said light source means, said light detecting means and said baffle means except for at least said free edges thereof.

11. A combination as defined in claim 1, said baffle means comprising a baffle element of a heavy metal having anti-fouling properties in water; and wherein said heating means includes at least one heating transistor in heat-exchanging contact with said baffle element, and further comprising a thermistor control associated with said transistor, and thermostat means also associated with said transistor.

12. A combination as defined in claim 1, wherein said baffle means is arranged symmetrically about an axis of said apparatus, such that the volume of space traversed by said path surrounds an outer periphery of said baffle means; and further comprising mounting means for mounting said baffle means, light source means and detecting means, said mounting means extending into a bi-conical volume of space defined by the shortest unobstructed light path between said openings.

13. A combination as defined in claim 1; further comprising a chargeable source of electrical energy operatively associated with said light source means; and photoelectric charging means connected with said energy source and operative for charging the same in response to the incidence of light of requisite brightness onto said charging means.

14. In an apparatus for measuring visibility in a fluid, a combination comprising a source of diffuse emitted light; a non-focused light receiver spaced from said source; and a heated baffle unit of thermally conductive material having anti-fouling properties in at least some fluids, interposed between said source and said receiver for preventing direct passage of light from the former to the latter.

* * * * *